(12) United States Patent
Veiga

(10) Patent No.: US 6,994,356 B2
(45) Date of Patent: Feb. 7, 2006

(54) GASKET SEAL FOR FLANGES OF PIPING AND EQUIPMENT, A METHOD FOR MANUFACTURING GASKET SEALS, AND A SEALING RING FOR A GASKET SEAL

(75) Inventor: José Carlos C. Veiga, Rio de Janiero (BR)

(73) Assignee: Manegro Administracao e Paticipacoes Ltda, Rio de Janeiro (BR)

( * ) Notice: Subject to any disclaimer, the term of this patent is extended or adjusted under 35 U.S.C. 154(b) by 32 days.

(21) Appl. No.: 10/379,624

(22) Filed: Mar. 5, 2003

(65) Prior Publication Data

US 2004/0004327 A1    Jan. 8, 2004

(30) Foreign Application Priority Data

Jul. 3, 2002    (BR) .................................. 0202511

(51) Int. Cl.
*F16L 17/00* (2006.01)
(52) U.S. Cl. ...................... 277/616; 277/637; 285/379; 285/108
(58) Field of Classification Search ................ 277/611, 277/616, 626, 637–9; 285/108, 379
See application file for complete search history.

(56) References Cited

U.S. PATENT DOCUMENTS

| | | | | |
|---|---|---|---|---|
| 1,738,513 A | * | 12/1929 | Bailey | 277/598 |
| 1,896,795 A | * | 2/1933 | Kendall | 277/609 |
| 2,462,762 A | * | 2/1949 | Nardin | 277/609 |
| 3,346,263 A | * | 10/1967 | Newcomer | 277/613 |
| 3,845,961 A | * | 11/1974 | Byrd, III | 277/606 |
| 4,232,496 A | * | 11/1980 | Warkentin | 403/288 |
| 5,335,411 A | * | 8/1994 | Muller et al. | 29/512 |
| 5,366,261 A | * | 11/1994 | Ohmi et al. | 285/328 |
| 5,482,332 A | * | 1/1996 | Ohmi et al. | 285/328 |
| 5,524,906 A | * | 6/1996 | Rackov et al. | 277/609 |
| 5,720,505 A | * | 2/1998 | Ohmi et al. | 285/328 |
| 5,895,054 A | * | 4/1999 | Miyaoh et al. | 277/595 |
| 6,322,084 B1 | * | 11/2001 | Yamada et al. | 277/591 |
| 6,367,803 B1 | * | 4/2002 | Loth | 277/321 |
| 6,367,813 B1 | * | 4/2002 | Braun et al. | 277/630 |
| 6,547,255 B1 | * | 4/2003 | Donaway et al. | 277/602 |
| 6,581,941 B2 | * | 6/2003 | Carr | 277/609 |

* cited by examiner

*Primary Examiner*—Alison K. Pickard
(74) *Attorney, Agent, or Firm*—Cowan, Liebowitz & Latman, P.C.

(57) ABSTRACT

A gasket seal for piping and equipment flanges comprises a sealing ring and a centralization ring, preferably concentric rings made of a metallic alloy. The sealing ring has an outer contour surface having a substantially L-shaped cross-section comprising an innermost portion and an outermost portion extending axially and a radial portion interconnecting the inner and the outer portions. The centralization ring has an inner contour surface defining a central opening, substantially coincident with the innermost portion of the outer contour surface of the sealing ring, so that the latter can be fitted into the opening as far as the radial portion of its outer contour surface. A deformation is made on the innermost portion of the outer contour surface of the sealing ring, forming a projection, whereby the centralization ring can be retained between the projection and radial portion without the centralization ring needing to be separated and then welded.

22 Claims, 3 Drawing Sheets

Cross Section A-A

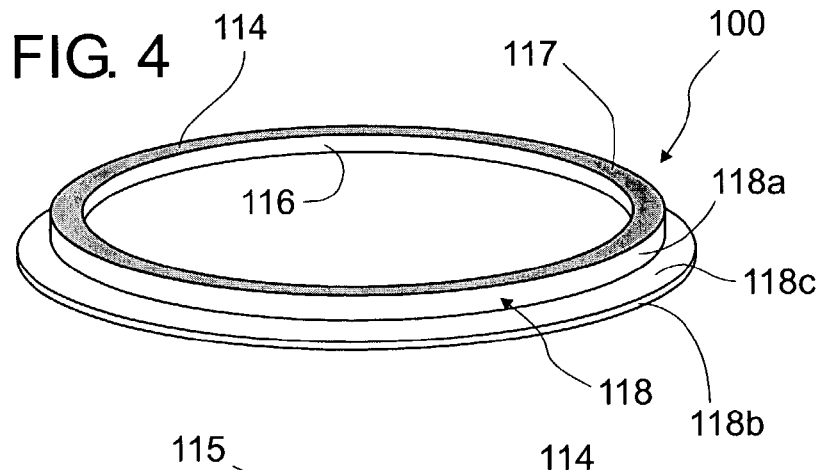
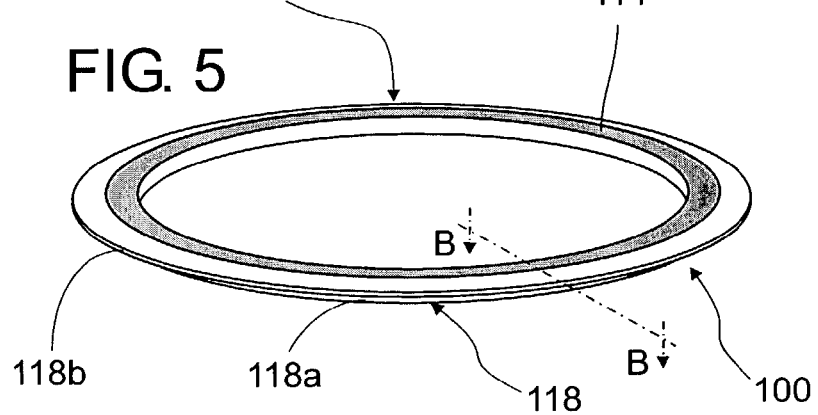
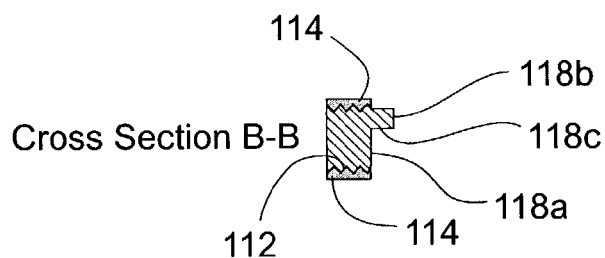
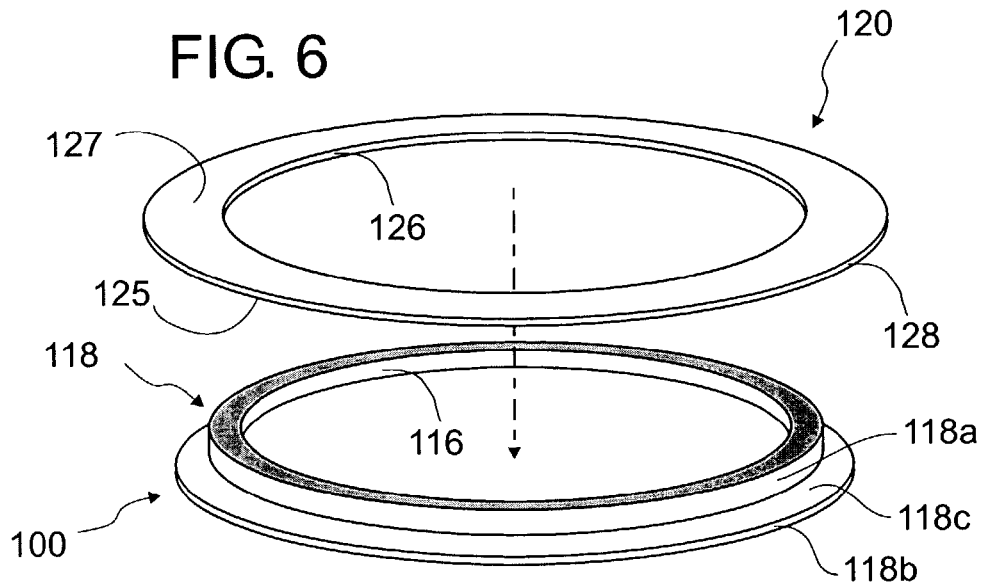

Cross Section C-C

GASKET SEAL FOR FLANGES OF PIPING AND EQUIPMENT, A METHOD FOR MANUFACTURING GASKET SEALS, AND A SEALING RING FOR A GASKET SEAL

This invention constitutes a gasket seal for application in flanges of piping and equipment, a method for manufacturing gasket seals, and sealing rings for gasket seals.

DESCRIPTION OF THE PRIOR ART

A number of metallic and semi-metallic seals have been developed for piping and equipment. The most usual ones are spiral gaskets, flat metallic gaskets, serrated metallic gaskets with graphite or PTFE coating or ("Camprofile"), graphite gaskets with metallic inserts and gaskets with metallic jackets, which are installed between the flanges when the latter are tightened against each other (usually by means of sets of bolts and nuts). In order to achieve high resistance to pressure and good seating to the flange surfaces, the gaskets are formed of different combinations of materials and shapes.

Among the gaskets of the prior art, the metallic serrated gaskets with a graphite or PTFE coating have achieved a good performance in sealing piping and equipment. As will be described and illustrated below, this gasket basically consists of a combination of a metallic ring having serrated surfaces and a thin sealing layer, which is usually made of flexible graphite or expanded PTFE.

FIG. 1 illustrates an example of "Camprofile"-type gasket having a sealing ring 10 with a serrated profile 12 and a sealing coating 14. The serrated profile is usually made from metallic alloys such as, for example, stainless steel, and provides high sealability with low tightening of the flange bolts. The thin sealing layer, in turn, fills the unevenness on the flange surfaces and, furthermore, prevents contact of the serrated profile of the gasket with these surfaces, which might damage them. In addition, this coating further increases the sealability, thus combining the resistance of a metallic gasket with the sealability of the graphite or expanded PTFE. In order to achieve centralization of the gasket on the flanges of piping and equipment, the gasket has a part of lesser thickness 300 (cross-section A—A), the outer contour 318 of which touches the flange bolts (not shown), centralizing the gasket. This construction, however, has the disadvantage of two different thicknesses. This difference in thickness causes different thermal expansions on the bodies of gaskets that work with very high or cryogenic temperatures. This variation in thermal expansion between the parts of different thickness of the gasket causes cracks that may eventually lead to breakage thereof and total failure. A solution to prevent this premature failure of the gasket is to machine a recess 330 on the surface 300 so as to cause the surface 300 to separate from the sealing ring 10 when there is differential expansion between the two surfaces of the gaskets. In addition to the serious problem of premature failure, these constructions, with or without recess, are very expensive, since they require machining and great wastage of material.

As an alternative to the problems of thermal expansion and high cost, the ring 10 may be built with a U-shaped transversal section that receives a centralization ring 20, as depicted in FIG. 2. The sealing ring 10 has an outer contour surface 18, inner contour surface 16, lower surface 15 and upper surface 17. The outer surface 18 has a U-shaped transversal section projecting outwards. The outer ends 18a of the outer contour surface 18 define the outer limit of the ring 10, the inner contour surface 16 defines a central opening coinciding with the sealing surface of the flanges (not shown), and the lower surface 15 and upper surface 17 consist of respective lower and upper prolongations of the surfaces of outer contour 18 and inner contour 16.

FIGS. 2 and 3 also illustrate a centralization ring 20 to centralize the sealing ring 10 on the flanges of piping and equipment (not shown). This centralization ring 20 may be made from the same material as the sealing ring 10 or from another material. In addition, its surfaces comprise outer contour surface 28, inner contour surface 26, lower surface 25 and upper surface 27. The inner contour surface 26 defines a central opening, into which the sealing ring 10 fits, and the lower surface 25 and upper surface 27 consist of respective lower and upper prolongations of the outer contour surface 28 and inner contour surface 26.

As shown in FIG. 2, when manufacturing these Camprofile-type annular gaskets, the centralization ring 20, produced by known machining and stamping processes, is split into two parts, so that each one will be separately fitted into the U-profile of the outer surface of the sealing ring 10. The ring 10 is also produced by any one of the known machining and stamping processes. In the step following the fitting, the parts of the centralization ring 20 are joined together, by means of welding. FIG. 3 illustrates welding lines 30. In this way, the centralization ring remains retained on the outer surface with the U-shaped profile of the sealing ring, in order to centralize it properly on the flanges of piping and equipment.

This construction in two separate parts prevents the problem of thermal expansion, since the rings 10 and 20 are independent of each other, which allows them to expand independently. Since they are independently constructed from materials of different thickness, their cost is also lower than that of the gaskets constructed from a single ring. However, one can see that methods of the prior art for fitting centralization rings on sealing rings have the drawback of involving steps of separating the centralization rings and then welding them.

It is an objective of the present invention to provide a gasket seal, a process of manufacturing gaskets and a sealing ring, wherein the centralization ring does not need to be separated and then welded in order to fit into the sealing ring.

SUMMARY OF THE INVENTION

The present invention achieves these and other objectives by means of a gasket seal for sealing flanges of piping and equipment, a process of manufacturing a gasket and a sealing ring.

The gasket of the present invention comprises a sealing ring and a centralization ring to centralize the sealing ring on the flanges of the piping and equipment. Preferably, the sealing ring and the centralization ring are concentric and made of metal alloys.

The sealing ring comprises a ring and has an outer contour surface, a lower surface and an upper surface, the outer contour surface defining the outer limit of the sealing ring, and the lower and upper surfaces consisting of respective lower and upper prolongations of the outer contour surface. The outer contour surface has a substantially L-shaped cross-section, comprising an innermost portion and an outermost portion extending axially and a radial portion interconnecting the inner and outer portions. Although preferred embodiments have an outer contour surface with an L-shaped section, other embodiments may have outer surfaces with other profiles, wherein the respective outermost portions are located in different axial regions of these surfaces.

The centralization ring comprises outer contour surfaces, inner contour surfaces, lower surface and upper surface. The inner contour surface defines a central opening, which is substantially coincident with the innermost portion of the outer contour surface of the sealing ring, so that the latter can be fitted into the opening as far as the radial portion of its outer surface, making contact with the upper or lower surface of the centralization ring (depending upon the side on which the ring is inserted). In this way, the radial portion acts as a stop. The lower and upper surfaces of the centralization ring consist of respective lower and upper prolongations of the outer contour surface and inner contour surface.

In order for the sealing ring to be duly retained in the centralization ring, when it is inserted into the latter, a deformation is made on the innermost portion of the outer contour surface of the sealing ring, forming a projection. In particular, the deformation is made in an axial region away from the radial portion, so that the centralizing ring will be retained between the projection and the radial portion. The projection also acts as a stop. In preferred embodiments, this deformation is made by punching.

One can see that the present invention presents a solution by which the centralization ring is fitted into the sealing ring without the need to be separated and then welded.

The present invention also achieves these objectives by means of a process for manufacturing a gasket seal, which comprises fitting the sealing ring into the centralization ring as far as the radial portion of the former, making contact with the upper or lower surface of the latter. Next, the process of the invention includes the step of deforming the innermost portion of the outer contour surface of the sealing ring, forming a projection. In particular, the deformation is made in a region axially apart from the radial portion, so that the centralization ring will be retained between the radial portion and the projection. In preferred embodiments, this deformation is made by punching.

BRIEF DESCRIPTION OF THE DRAWINGS

The present invention will now be described in greater detail with reference to an embodiment represented in the drawings, in which:

FIG. 4 is a perspective view of the top of the sealing ring of the present invention;

FIG. 5 is a perspective view of the bottom of the sealing ring of the present invention;

FIG. 6 is a perspective view of the fitting of a centralization ring on to a sealing ring of the present invention;

DETAILED DESCRIPTION OF THE INVENTION

Figure 1:
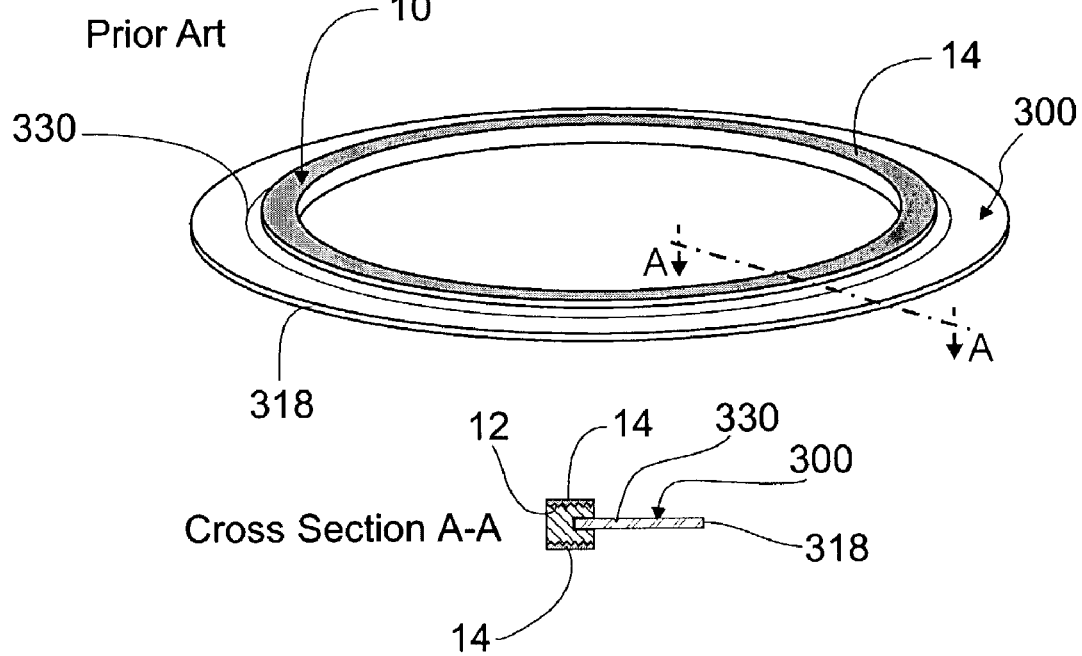
FIG. 1 is a perspective view of a sealing ring of the prior art.
Figure 2:
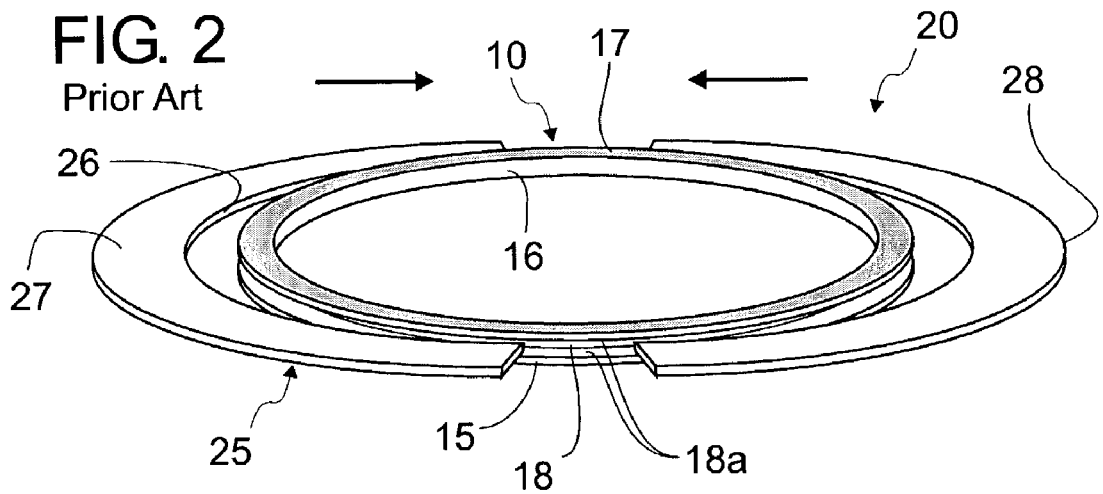
FIG. 2 is a perspective view of the fitting of a centralization ring on to another sealing ring of the prior art.
Figure 3:
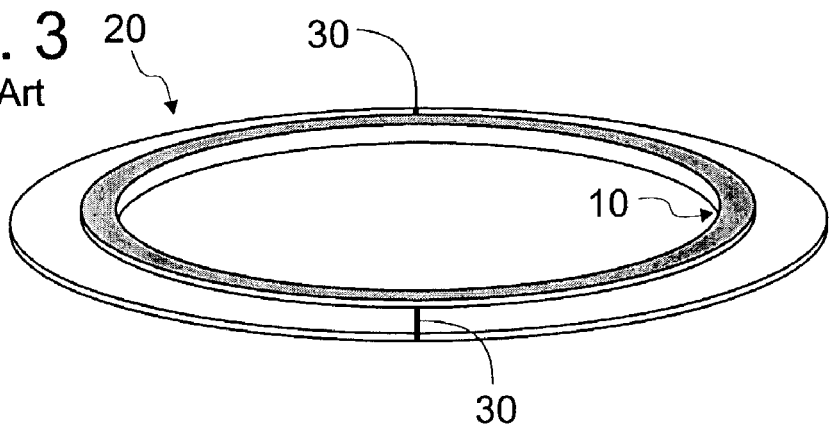
FIG. 3 is a perspective view of the sealing ring of the figure 2 fitted into a centralization of the prior art.

As illustrated in FIGS. 4 and 5, the present invention may be embodied in a sealing ring 100 to be inserted into flanges of piping and equipment, so as to make the sealing of these piping and equipment when these flanges are tightened against each other (usually by means of nuts and bolts). The ring 100 of this embodiment comprises an outer contour surface 118, an inner contour surface 116, a lower surface 115 and an upper surface 177. The outer contour surface 118 comprises a substantially L-shaped cross-section comprising an innermost portion 118*a*, an outermost portion 118*b* extending axially, and a radial portion 118*c* interconnecting the inner and outer portions. The inner contour surface 116 defines a central opening coinciding with the openings of the flanges of the piping and equipment (not shown). The lower surface 115 and upper surface 117, shown in FIGS. 4 and 5, respectively, consist of respective lower and upper prolongations of the outer contour surface 118 and inner contour surface 116, and have a serrated profile 112 (concentric grooves) and a sealant coating 114 (cross section B—B). Although the sealing ring 100 of this embodiment consists of a substantially circular ring, the latter may be carried out in a square, rectangular or triangular shape, among others, without departing from the scope of the present invention.

The sealing ring 100 may be made by any one of the known machining, stamping and shaping methods. Preferably, the material employed in this ring should be a metallic alloy, which may be carbon steel or an alloy of the types AISI 304, stainless steel AISI 3041, stainless steel AISI 316, stainless steel AISI 3161, stainless steel AISI 321, stainless steel 347, which are rigid steels or steel alloys, among others. Moreover, other alloys comprising nickel, copper, aluminum, chromium, titanium may be used in the composition of the sealing ring 100.

In preferred embodiments, the sealing layer 114 is made of graphite or a polymeric material. If the layer is made of graphite, preferably, flexible graphite is employed. Preferably, this layer is of Graflex® flexible material. With regard to the polymeric material, expanded PTFE may be applied.

Although this embodiment has serrated profiles 112 and sealing layers 114, other embodiments may have smooth surfaces with no seals, without departing from the scope of the present invention.

In order to properly centralize the sealing ring 100 between the flanges of the piping or equipment (not shown), the present invention may include a centralization ring 120, as shown in FIG. 6. This ring 120 is made of the same material as the sealing ring 100, though it may be made from other materials in other embodiments. In addition, its surfaces comprise an outer contour surface 128, an inner contour surface 126, a lower surface 125 and an upper surface 127. The outer contour surface 128 defines the outer limit defines the outer limit of the ring 120, and the inner contour surface 126 defines a central opening into which the sealing ring 100 fits. The lower surface 125 and upper surface 127 consist of respective lower and upper prolongations of the outer contour surface 128 and inner contour surface 126.

The central opening of the centralization ring 120 coincides with the innermost portion 118*a*, so that the sealing ring 100 can be inserted into the opening of the centralization ring 120, as far as its radial portion 118*c*, making contact with the upper surface 127 or the lower surface 125 of the latter (depending upon the side from which the ring 100 is inserted).

Figure 7:
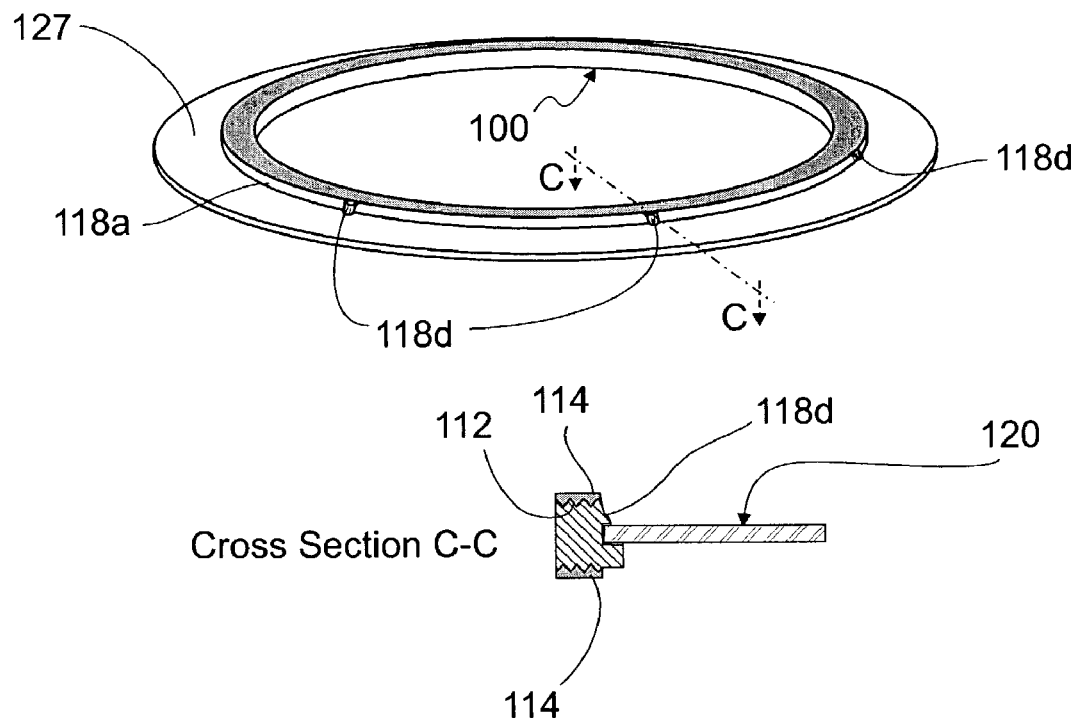
FIG. 7 is a perspective view of a sealing ring fitted into a centralization ring of the present invention.
Figure 8:
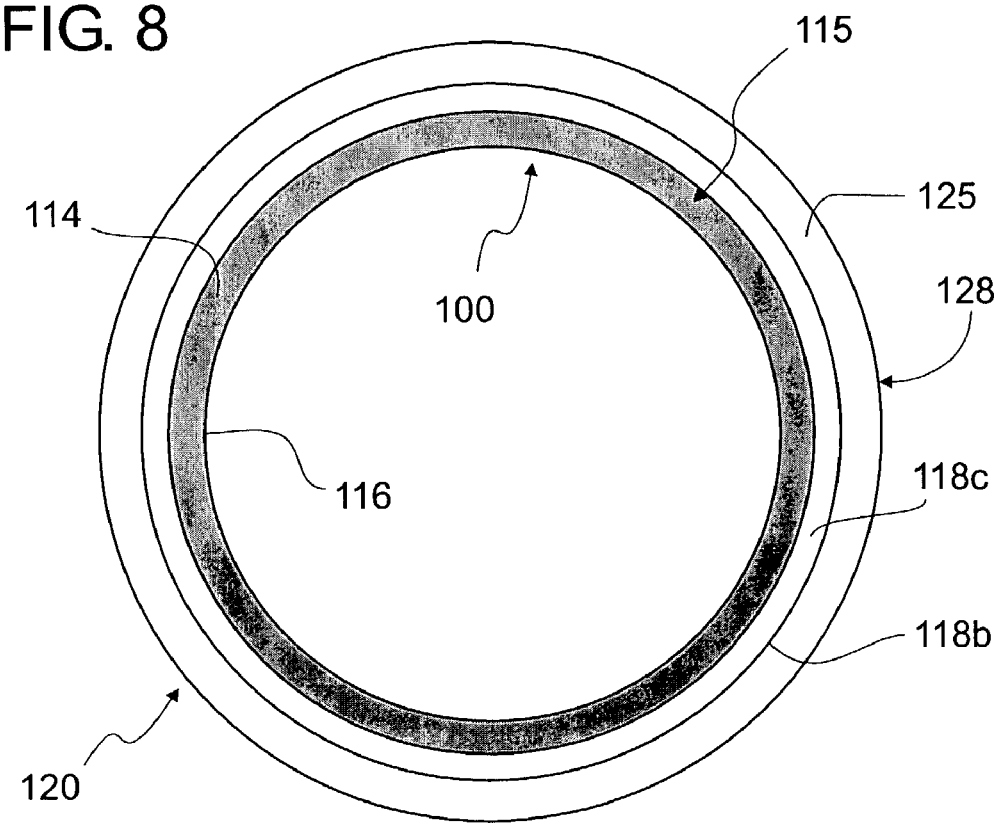
FIG. 8 is a bottom view of the embodiment depicted in FIG. 7.

As shown in FIG. 7, especially in cross section C–C, in order for the sealing ring to be duly retained in the centralization ring 120, deformation is made on the innermost portion 118a of the outer contour surface 118 of the sealing ring 100, forming a stop. In particular, the deformation is made in a region axially apart from the radial portion 118c, so that the centralization ring 120 will be retained between the deformation 118d and the radial portion 118c. In this preferred embodiment, the deformation is made by punching. FIG. 8 depicts a bottom view of the sealing retained in the centralization ring 120.

One can see that the present invention presents a solution by which the centralization ring is fitted into the sealing ring without the need to be separated and then welded.

Having described preferred embodiments, it should be understood that the scope of the present invention embraces other possible variations, limited only by the contents of the accompanying claims, which include the possible equivalents.

What is claimed is:

1. A gasket seal comprising:
    a sealing ring having an outer contour surface, a lower surface and an upper surface; and
    a rigid centralization ring to centralize the sealing ring between the flanges of piping and equipment, having an inner contour surface, lower surface and upper surface, the inner contour surface defining a central opening, into which the sealing ring fits; the outer contour surface of the sealing ring having a substantially L-shaped configuration, comprising an innermost portion and an outermost portion extending axially, and a radial portion, which interconnects the innermost portion and the outermost portion, wherein the opening of the centralization ring substantially coincides with said innermost portion, so that the sealing ring can be inserted into the opening of the centralization ring as far as the radial portion, making contact with one of the upper or lower surfaces of the centralization ring; the innermost portion further includes a deformation projecting outwards and located axially apart from the radial portion, so that the centralization ring will be retained on one side by the deformation, and on the other side by the radial portion.

2. The gasket seal according to claim 1, wherein the upper and lower surfaces of the sealing ring have concentric grooves.

3. The gasket seal according to claim 2, wherein the gasket seal further comprises a coating of a deformable material on the upper and lower surfaces of the sealing ring.

4. The gasket seal according to claim 3, wherein the coating of deformable material comprises graphite.

5. The gasket seal according to claim 4, wherein the coating of deformable material comprises a polymer.

6. The gasket seal according to claim 5, wherein the polymer is PTFE.

7. The gasket seal according to claim 3, wherein the coating of deformable material comprises flexible graphite.

8. The gasket seal according to claim 1, wherein the upper surface and the lower surface of the sealing ring are smooth.

9. The gasket seal according to claim 1, wherein the sealing ring comprises a metallic alloy.

10. The gasket seal according to claim 9, wherein the metallic alloy comprises carbon steel alloy.

11. The gasket seal according to claim 9, wherein the metallic alloy comprises stainless steel alloy.

12. The gasket seal according to claim 9, wherein the metallic alloy comprises nickel alloy.

13. The gasket seal according to claim 9, wherein the metallic alloy comprises aluminum alloy.

14. The gasket seal according to claim 9, wherein the metallic alloy comprises copper alloy.

15. The gasket seal according to claim 9, wherein the metallic alloy comprises titanium alloy.

16. The gasket seal according to claim 1, wherein the centralization ring comprises a metallic alloy.

17. The gasket seal according to claim 1, wherein the centralization ring comprises the same material as the sealing ring.

18. The gasket seal according to claim 1, wherein the outermost portion is continuous along the outer surface of the sealing ring.

19. The gasket seal according to claim 1, wherein the deformation consists of a punched point.

20. The gasket seal according to claim 1, wherein the sealing ring further comprises an internal contour surface, defining a central opening.

21. A method of manufacturing a gasket seal comprising the steps of:
    fitting a sealing ring, having an outer contour surface, a lower surface and an upper surface wherein the outer contour surface has a substantially L-shaped configuration comprising an innermost portion and an outermost portion extending axially, and a radial portion interconnecting the innermost and outermost portions, into a central opening of a centralization ring, having an inner contour surface, a lower surface and an upper surface wherein the inner contour surface defines the central opening into which the sealing ring fits, as far as the radial portion of the sealing ring, making contact with the upper or lower surface of the centralization ring; and
    deforming a region in the innermost portion axially apart from the radial portion, so that the centralization ring will be retained, on one side, by the deformation and, on the other side, by the radial portion.

22. A method, according to claim 21, wherein the deforming step is carried out by punching.

* * * * *